United States Patent
Ebara et al.

(10) Patent No.: US 7,273,907 B2
(45) Date of Patent: Sep. 25, 2007

(54) POLYPROPYLENE RESIN COMPOSITION AND FILM

(75) Inventors: Takeshi Ebara, Chiba (JP); Hideaki Hori, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 337 days.

(21) Appl. No.: 10/397,295

(22) Filed: Mar. 27, 2003

(65) Prior Publication Data

US 2003/0187126 A1    Oct. 2, 2003

(30) Foreign Application Priority Data

Mar. 29, 2002   (JP) .............................. 2002-097931

(51) Int. Cl.
| | | |
|---|---|---|
| C08L 23/20 | (2006.01) | |
| C08L 23/16 | (2006.01) | |
| C08L 23/12 | (2006.01) | |
| C08L 23/08 | (2006.01) | |
| C08L 23/04 | (2006.01) | |

(52) U.S. Cl. .................. 525/191; 525/88; 525/89; 525/95; 525/240; 524/515

(58) Field of Classification Search .............. 525/88, 525/89, 95, 191, 240; 524/515
See application file for complete search history.

(56) References Cited

U.S. PATENT DOCUMENTS

| 4,786,562 A | 11/1988 | Kakugo et al. |
| 5,521,251 A | 5/1996 | Satoh et al. |
| 6,624,247 B2 * | 9/2003 | Kume et al. .................. 525/88 |
| 2002/0049283 A1 | 4/2002 | Kume et al. |

FOREIGN PATENT DOCUMENTS

| JP | 63-19255 A | 1/1988 |
| JP | 6-104698 B2 | 12/1994 |
| JP | 7-166005 A | 6/1995 |
| JP | 8-283343 A | 10/1996 |
| JP | 2002-69143 A | 3/2002 |

* cited by examiner

*Primary Examiner*—Kriellion A Sanders
(74) *Attorney, Agent, or Firm*—Sughrue Mion, PLLC

(57) ABSTRACT

There are provided a polypropylene resin composition comprising:
(i) 10 to 99% by weight of a specific propylene copolymer (X),
(ii) 0 to 60% by weight of a specific copolymer (Y), and
(iii) at least one member selected from the group consisting of 1 to 30% by weight of a specific propylene polymer (W) and 0.1 to 3 parts by weight of a nucleating agent (N); and a film comprising said polypropylene resin composition, or a laminated film having a layer comprising said polypropylene resin composition.

6 Claims, No Drawings

POLYPROPYLENE RESIN COMPOSITION AND FILM

FIELD OF THE INVENTION

The present invention relates to a film having optical properties such as transparency equal to those of a conventional film and moreover superior in its low temperature heat seal property, anti-blocking property and processability. The present invention also relates to a polypropylene resin composition capable of providing such a film.

BACKGROUND OF THE INVENTION

Polypropylene is superior in properties such as transparency, heat resistance and food hygienic property, and therefore extensively used in a field such as a film including a sheet. In recent years, high-speed packaging has increasingly advanced in a field of food packaging, and therefore a film having a good low temperature heat seal property has been desired.

As a film having a good low temperature heat seal property, for example, Japanese Patent No. 2,882,237 discloses a film comprising a polypropylene random copolymer, which is obtained by copolymerizing propylene and an α-olefin or copolymerizing propylene, ethylene and an α-olefin substantially in the absence of a solvent using a Zieglar Natta catalyst, wherein respective contents of a propylene unit, an ethylene unit, an α-olefin unit and a 20° C. xylene soluble portion are specified, and a unit of a comonomer such as the α-olefin and ethylene is increased in its content. However, the film has a problem that stiffness property and food hygienic property decrease when the comonomer unit content exceeds a certain degree. In the present invention, the term such as "propylene unit" means a polymerization unit of a monomer such as a polymerization unit of propylene.

Further, Japanese Patent Publication No. 2-57770 and Japanese Patent No. 3,070,419 disclose a polypropylene laminated film, which contains an outer layer comprising a polypropylene copolymer having an extremely high content of an α-olefin unit. However, the laminated film has a problem that its heat seal property deteriorates owing to corona treatment, and another problem that heat seal temperature cannot be sufficiently lowered due to occurrence of stickiness in a film formation step.

SUMMARY OF THE INVENTION

An object of the present invention is to provide a film having optical properties such as transparency equal to those of a conventional film and moreover superior in its low temperature heat seal property, anti-blocking property and processability.

Another object of the present invention is to provide a polypropylene resin composition capable of providing such a film.

The present inventors have undertaken extensive studies to accomplish the above-described objects. As a result, it has been found that the above-described problems can be solved by using a polypropylene resin composition comprising a specific propylene copolymer (X), a specific copolymer (Y) and at least one member selected from the group consisting of a specific propylene polymer (W) and a specific nucleating agent (N). Thereby, the present invention has been obtained.

The present invention provides a polypropylene resin composition comprising:
(i) 10 to 99% by weight of a propylene copolymer (X),
(ii) 0 to 60% by weight of a copolymer (Y), and
(iii) at least one member selected from the group consisting of 1 to 30% by weight of a propylene polymer (W) and 0.1 to 3 parts by weight of a nucleating agent (N), wherein,
(1) the propylene copolymer (X) comprises:
  (a) 1 to 30% by weight of a copolymer component (A) comprising propylene and at least one member selected from the group consisting of an α-olefin having not less than 4 carbon atoms and ethylene, and satisfying the following requirements (1) and (2), and
  (b) 70 to 99% by weight of a copolymer component (B) comprising propylene and at least one member selected from the group consisting of an α-olefin having not less than 4 carbon atoms and ethylene and propylene, and satisfying the following requirements (3) and (4), provided that a total of the copolymer components (A) and (B) is taken as 100% by weight,
(2) the copolymer (Y) comprises:
  (a) 3 to 14% by weight of at least one unit selected from the group consisting of an α-olefin unit and an ethylene unit, and
  (b) 86 to 97% by weight of a propylene unit, provided that a total of the selected unit(s) and the propylene unit is taken as 100% by weight,
(3) the propylene polymer (W) has a melting point of not lower than 155° C., and comprises:
  (a) 0 to less than 3% by weight of at least one unit selected from the group consisting of an ethylene unit and an α-olefin unit having not less than 4 carbon atoms, and
  (b) 97 to 100% by weight of a propylene unit,
(4) the propylene copolymer (X) has 15 to 36% of an endothermic heat quantity within a temperature range of from a temperature lower by 10° C. than a temperature corresponding to a maximum endothermic peak to a temperature higher by 10° C. than a temperature corresponding to a maximum endothermic peak, in measurement of a melting point by means of a differential scanning calorimeter, provided that an endothermic heat quantity within a temperature range of from 53 to 170° C. is taken as 100%,
(5) with respect to the % by weight of the propylene copolymer (X), the copolymer (Y) and the propylene polymer (W), a total weight thereof is taken as 100% by weight, and with respect to the part by weight, a total weight thereof is taken as 100 parts by weight, and
(6) the requirements are:
  requirement (1): a content of the α-olefin unit having not less than 4 carbon atoms in the copolymer component (A) is from 1 to less than 15% by mol,
  requirement (2): an ethylene unit content in the copolymer component (A) is not more than 5% by mol,
  requirement (3): a content of the α-olefin unit having not less than 4 carbon atoms in the copolymer component (B) is from 15 to 30% by mol, and
  requirement (4): an ethylene unit content in the copolymer component (B) is not more than 5 mol %.

The present invention also provides a film comprising the above-defined polypropylene resin composition, or a laminated film having a layer comprising said composition.

As the case may be, the "copolymer component (A)", "copolymer component (B)", "propylene copolymer (X)"

and "propylene polymer (W)" may be hereinafter referred simply to as "component (A)", "component (B)", "copolymer (X)" and "polymer (W)", respectively.

DETAILED EXPLANATION OF THE INVENTION

While the copolymer (X) used in the present invention has the endothermic heat quantity of from 15 to 36% as defined above, whether or not a certain copolymer has said endothermic heat quantity can be judged according to a measurement method comprising the steps of:

1. making a sheet having a thickness of 0.5 mm from the copolymer according to a heat-press molding, wherein the heat-press molding is carried out under conditions that after pre-heating for 5 minutes at 230° C., pressure is raised to 50 kgf/cm$^2$ over 3 minutes at 230° C. and kept at that level for 2 minutes, and successively the resultant is cooled in a different press machine kept at 30° C. while keeping pressure at 30 kgf/cm$^2$G for 5 minutes,
2. using a differential scanning calorimeter, a commercial name of DSC-7 Type, manufactured by Perkin Elmer Co.:
   (1) heat-treating 10 mg of the above-described sheet at 220° C. under nitrogen atmosphere,
   (2) lowering the temperature from 220° C. to 150° C. at a rate of 300° C./min.,
   (3) keeping the temperature at 150° C. for 1 minute,
   (4) lowering the temperature from 150° C. to 50° C. at a rate of 5° C./min.,
   (5) keeping the temperature at 50° C. for 1 minute, and
   (6) raising the temperature from 50° C. to 180° C. at a rate of 5° C./min.,
3. obtaining a straight line (base line) by linking a point of 53° C. and a point of 170° C. of a melting peak curve obtained in the above step 2,
4. obtaining an area (main endothermic heat quantity) surrounded with the base line and a melting peak curve between a point of "a temperature corresponding to a maximum endothermic peak −10° C." and a point of "a temperature corresponding to a maximum endothermic peak +10° C.", and
5. when the area obtained in the above step 4 is found to be from 15 to 36%, provided that an area (total endothermic heat quantity) surrounded with the straight line obtained in the above step 3 and the melting peak curve obtained in the above step 2 is taken as 100%, it is judged that the copolymer has an endothermic heat quantity of from 15 to 36% as defined above.

The above-defined endothermic heat quantity, from 15 to 36%, is preferably from 18 to 35%, more preferably from 20 to 34%, and particularly preferably from 22 to 32%. When the endothermic heat quantity exceeds 36%, a melting point distribution of the copolymer (X) becomes narrow, and as a result, stickiness of a film occurs in a processing temperature range for the film formation, thereby lowering the operation or deteriorating corona treatment resistance of a film. When the endothermic heat quantity is less than 15%, a crystallization speed at the time of processing for the film formation decreases to cause inconvenience such as lowering of operation for the film formation.

A melt flow rate (hereinafter referred to as "MFR") measured at 230° C. of the copolymer (X) is not particularly limited. From a viewpoint of flowability of said copolymer or film formation property of the polypropylene resin composition obtained, it is preferably from 0.1 to 50 g/10 min., and more preferably from 1 to 20 g/10 min. In order to control the flowability of the copolymer, the MFR may be varied in a conventional manner at the time of melt-kneading the copolymer. The conventional manner includes, for example, a method of melt-kneading a combination of the copolymer and an organic peroxide.

Examples of the copolymer (X) are a (propylene-1-butene)-(propylene-1-butene) copolymer, a (propylene-1-butene)-(propylene-ethylene-1-butene) copolymer, a (propylene-ethylene-1-butene)-(propylene-1-butene) copolymer, a (propylene-ethylene-1-butene)-(propylene-ethylene-1-butene) copolymer and a (propylene-1-hexene)-(propylene-1-hexene) copolymer. Among them, preferable is a (propylene-1-butene)-(propylene-1-butene) copolymer or a (propylene-1-hexene)-(propylene-1-hexene) copolymer, and more preferable is a (propylene-1-butene)-(propylene-1-butene) copolymer. Two parentheses in the above-exemplified respective copolymers mean that respective copolymers (X) are produced by a two-polymerization step process, and the former parenthesis means a copolymer component (A) obtained in the first polymerization step, and the latter parenthesis means a copolymer component (B) obtained in the second polymerization step.

A content of the component (A) in the copolymer (X) is from 1 to 30% by weight, preferably from 5 to 30% by weight, and more preferably from 5 to 20% by weight, and a content of the component (B) therein is from 70 to 99% by weight, preferably from 70 to 95% by weight, and more preferably from 80 to 95% by weight, provided that a total weight of the components (A) and (B) is taken as 100% by weight.

When the content of the component (A) is less than 1% by weight, in other words, when the content of the component (B) exceeds 99% by weight, powder state of the copolymer at the time of polymerization may deteriorate to decrease productivity. When the content of the component (A) exceeds 30% by weight, in other words, when the content of the component (B) is less than 70% by weight, a film comprising the polypropylene resin composition may become insufficient in its low temperature heat seal property.

The component (A) is preferably a copolymer of propylene and an α-olefin having not less than 4 carbon atoms. A content of the α-olefin having not less than 4 carbon atoms in the component (A) is from 1 to less than 15% by mol, preferably from 1 to less than 12% by mol, and more preferably from 1 to 10% by mol. When the content is less than 1% by mol, the polypropylene resin composition may deteriorate in its low temperature heat seal property. When it is not less than 15% by mol, the polymerization to obtain the component (A) may not be steadily carried out.

An ethylene content in the component (A) is not more than 5% by mol, and preferably not more than 3% by mol. When the content exceeds 5% by mol, a film comprising the polypropylene resin composition may be whitened with the lapse of time or may be weakened in its stiffness.

The component (B) is preferably a copolymer of propylene and an α-olefin having not less than 4 carbon atoms. A content of the α-olefin having not less than 4 carbon atoms in the component (B) is from 15 to 30% by mol, and preferably from 15 to 25% by mol. When the content is less than 15% by mol, a film comprising the polypropylene resin composition may be insufficient in its low temperature heat seal property. When it exceeds 30% by mol, said film may be weakened in its stiffness.

An ethylene content in the component (B) is not more than 5% by mol, and preferably not more than 3% by mol. When the content exceeds 5% by mol, a film comprising the polypropylene resin composition may be whitened with the lapse of time or may be weakened in its stiffness.

Examples of the α-olefin having not less than 4 carbon atoms in the components (A) and (B) are 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-heptene, propyl-1-pentene, diethyl-1-butene, 1-nonene, 1-decene, 1-undecene and 1-dodecene. Among them, preferable is 1-butene, 1-pentene, 1-hexene or 1-octene. More preferable is 1-butene or 1-hexene from a view point of copolymerization characteristics and economy of the copolymer (X).

Examples of the component (A) or (B) are a propylene-1-butene copolymer component, a propylene-1-hexene copolymer component, a propylene-ethylene-1-butene copolymer component and a propylene-ethylene-1-hexene copolymer component. Among them, preferable is a propylene-1-butene copolymer component or a propylene-1-hexene copolymer component. The components (A) and (B) may contain the same or different kinds of monomers. Also, the components (A) and (B) may have any chemical bond, or may have no chemical bond between them. Further, the components (A) and (B) may be a copolymer containing a combination thereof.

A process for producing the copolymer (X) is exemplified, for example, in US-2002-0049283-A1 (publication No. of the US patent application). Examples of a catalyst used in said process are those disclosed in JP 61-218606 A, JP 61-287904 A and JP 7-216017 A.

A propylene unit content of the copolymer (Y), which is an optional component in the present invention, is from 86 to 97% by weight, preferably from 88 to 97% by weight, and more preferably from 88 to 96.5% by weight. With respect to a monomer unit content in the copolymer (Y):

(1) when the copolymer (Y) is a copolymer of propylene and an α-olefin having not less than 4 carbon atoms, a content of the α-olefin having not less than 4 carbon atoms in said copolymer is a value obtained by subtracting the above-described propylene unit content from 100% by weight, (2) when the copolymer (Y) is a copolymer of propylene and ethylene, an ethylene content in said copolymer is a value obtained by subtracting the above-described propylene unit content from 100% by weight, and (3) when the copolymer (Y) is a copolymer of propylene, an α-olefin having not less than 4 carbon atoms and ethylene, a total content of the α-olefin unit having not less than 4 carbon atoms and an ethylene unit is a value obtained by subtracting the above-described propylene unit content from 100% by weight, wherein a weight ratio of the α-olefin unit to the ethylene unit is preferably from 90/10 to 30/70.

Preferable copolymer (Y) is a random copolymer of propylene and at least one member selected from the group consisting of an α-olefin having not less than 4 carbon atoms and ethylene. Examples of the copolymer (Y) are a crystalline ethylene-propylene random copolymer and a crystalline ethylene-butene-1-propylene random copolymer.

A melting point of the copolymer (Y) is preferably lower than 155° C., and more preferably not higher than 150° C. A melting point of not lower than 155° C. is avoided, because it becomes difficult to lower a heat seal temperature of the polypropylene resin composition obtained to a desired degree.

A cold xylene-soluble portion content in the copolymer (Y) is preferably not more than 15% by weight, more preferably not more than 13% by weight, and much more preferably not more than 10% by weight, provided that a weight of the copolymer is taken as 100% by weight. It is not desirable that the content exceeds 15% by weight, because a content of a component extracted with a solvent in the polypropylene resin composition obtained increases.

An MFR of the copolymer (Y) is preferably from 0.1 to 50 g/10 min., more preferably from 1 to 20 g/10 min., and much more preferably from 1 to 15 g/10 min.

A melting point of the polymer (W) used in the present invention is not lower than 155° C., and preferably not lower than 157° C. When the melting point is lower than 155° C., the polypropylene resin composition deteriorates in its processability.

The polymer (W) used in the present invention means a polymer, which comprises (a) 0 to less than 3% by weight of at least one unit selected from the group consisting of an ethylene unit and an α-olefin unit having not less than 4 carbon atoms, and (b) 97 to 100% by weight of a propylene unit. Examples of the polymer (W) are a propylene homopolymer, a propylene-ethylene copolymer, a propylene-butene-1 copolymer and a propylene-ethylene-butene-1 copolymer. Among them, preferable is a random copolymer.

An MFR of the polymer (W) is preferably from 0.1 to 200 g/10 min., and more preferably from 1 to 160 g/10 min.

A cold xylene-soluble portion content in the polymer (W) is preferably not more than 10% by weight, more preferably not more than 7% by weight, and much more preferably not more than 5% by weight, provided that a weight of the polymer is taken as 100% by weight. It is not desirable that the content exceeds 10% by weight, because a content of a component extracted with a solvent in the polypropylene resin composition obtained increases.

The nucleating agent used in the present invention is not limited, and may be a conventional one such as crystal nucleating agents and nucleating action-carrying resins.

Examples of the above-mentioned nucleating agent are phosphate nucleating agents such as sodium bis(4-tert-butylphenyl) phosphate and sodium 2,2'-methylenebis(4,6-di-tert-butylphenyl) phosphate; and sorbitol nucleating agents such as 1,3,2,4-dibenzylidene sorbitol, which is disclosed in JP 59-164348 A and JP 63-132937 A, and whose benzylidene group may be substituted with a methyl group, an ethyl group, a methoxy group or a chloro group at its 4-position, and may be substituted with a methyl group at each of its 2 and 4-positions, bis(p-methylbenzylidene) sorbitol and bis(p-ethylbenzylidene) sorbitol.

Examples of the above-mentioned nucleating action-carrying resin are a branched α-olefin polymer, an aliphatic cyclic polymer, a substituted polystyrene and a high density polyethylene.

A content of the copolymer (X) in the polypropylene resin composition in accordance with the present invention is from 10 to 99% by weight, preferably from 20 to 99% by weight, and more preferably from 30 to 99% by weight; a content of the copolymer (Y) therein is from 0 to 60% by weight, and preferably from 0 to 50% by weight; and a content of the polymer (W) therein is from 1 to 30% by weight, and preferably from 1 to 20% by weight, provided that a total weight of the copolymer (X), the copolymer (Y) and the polymer (W) is taken as 100% by weight. A content of the nucleating agent (N) is from 0.1 to 3 parts by weight, and preferably from 0.1 to 2 parts by weight, provided that a total weight of the copolymer (X), the copolymer (Y) and the polymer (W) is taken as 100 parts by weight.

When the content of the copolymer (X) is less than 10% by weight, a film comprising the polypropylene resin composition becomes unsatisfactory in its low temperature heat seal property. When it exceeds 99% by weight, said composition deteriorates in its processability. When the content of the copolymer (Y) exceeds 60% by weight, a film comprising the polypropylene resin composition becomes unsatisfactory in its low temperature heat seal property. When the content of the polymer (W) is less than 1% by weight, the polypropylene resin composition deteriorates in its processability. When it exceeds 30% by weight, a film comprising the polypropylene resin composition becomes unsatisfactory in its low temperature heat seal property. When the content of the nucleating agent (N) is less than 0.1 part by weight, the polypropylene resin composition deteriorates in its processability. When it exceeds 3 parts by weight, a film comprising said composition deteriorates in its properties such as transparency.

A content of a component extracted with a solvent in the polypropylene resin composition in accordance with the present invention is preferably not more than 30% by weight, and more preferably not more than 28% by weight. An MFR of said composition is preferably from 0.1 to 50 g/10 min., more preferably from 1 to 20 g/10 min., and much more preferably from 2 to 15 g/10 min.

A method for producing the polypropylene resin composition in accordance with the present invention is not limited. Conventional methods comprising dispersing respective components uniformly, for example, an extrusion melt-blending method and a Banbury blending method are exemplified. Alternatively, the above-defined composition can be obtained according to a so-called multi-stage polymerization method wherein each polymerization is carried out under polymerization conditions varied step by step.

If desired, respective components used for the production of the polypropylene resin composition in accordance with the present invention may be used in combination with other additives such as antioxidants, ultraviolet absorbers, antistatic agents, lubricants, tackifying agents, anti-fogging agents and anti-blocking agents, and other resins such as polyolefin resins such as polyethylene resin and polypropylene resin.

A method for producing a film or laminated film in accordance with the present invention is not limited. A method wherein the polypropylene resin composition in accordance with the present invention is formed into a film according to a conventional tubular film, T-die or calendering process is exemplified. The laminated film comprises at least one layer of a film containing the polypropylene resin composition and at least one layer of a film containing a resin or a resin composition other than said composition. The laminated film can be formed, for example, according to a conventional co-extrusion molding, extrusion lamination, heat lamination or dry lamination process.

The film or laminated film in accordance with the present invention may be a uniaxial or biaxial oriented film or a laminated film. As a stretching method, a roll stretching method, a tenter stretching method and a tubular stretching method are exemplified. From a viewpoint of balance of properties such as low temperature heat seal property, transparency and stiffness property of the film or laminated film obtained, a non-orientation co-extrusion molding process and a biaxial orientation process are preferably applied for the production thereof.

The film or laminated film in accordance with the present invention can be used, for example, for wrapping foods or clothes, particularly preferably for wrapping foods.

EXAMPLE

The present invention is explained in more detail with reference to the following Examples and Comparative Examples, which are only illustrative and not to be construed to limit the scope of the present invention.

Methods for preparing samples and those for measuring physical properties used in Examples and Comparative Examples were as follows.

1. Contents of Polymer Components (A) and (B) in Propylene Copolymer (X) (% by Weight)

They were obtained from a material balance when producing the propylene copolymer (X).

2. 1-Butene Unit Content (% by Weight)

It was found from characteristic absorption at 770 $cm^{-1}$ obtained according to IR spectrum measurement method described in "Kobunshi (Polymer Hand Book" issued by Kinokuniya Shoten (book store), in 1995, page 619, or from characteristic absorption according to $^{13}C$ NMR.

3. Ethylene Unit Content (% by Weight)

It was found using a standard sample in a conventional manner from characteristic absorption at 732 to 720 $cm^{-1}$ obtained using an infrared spectrophotometer.

4. Melting Point (T, ° C.)

It was found according to a method comprising the steps of:

(1) making a sheet having a thickness of 0.5 mm from a resin according to a heat-press molding, wherein the heat-press molding is carried out under conditions that after pre-heating for 5 minutes at 230° C., pressure is raised to 50 $kgf/cm^2$ over 3 minutes at 230° C. and kept at that level for 2 minutes, and successively the resultant is cooled in a different press machine kept at 30° C. while keeping pressure at 30 $kgf/cm^2G$ for 5 minutes, (2) using a differential scanning calorimeter, a commercial name of DSC-7 Type, manufactured by Perkin Elmer Co.:

① heat-treating 10 mg of the above-described sheet at 220° C. under nitrogen atmosphere, ② lowering the temperature from 220° C. to 150° C. at a rate of 300° C./min., ③ keeping the temperature at 150° C. for 1 minute, ④ lowering the temperature from 150° C. to 50° C. at a rate of 5° C./min., ⑤ keeping the temperature at 50° C. for 1 minute, and ⑥ raising the temperature from 50° C. to 180° C. at a rate of 5° C./min., and (3) taking, as a melting point, a temperature showing a maximum endothermic peak in a melting curve obtained in the above step (2).

5. Melt Flow Rate (MFR, g/10 minutes)

It was measured according to JIS K 7210 at 230° C. under a load of 21.18 N.

6. Transparency (Haze, %)

It was measured according to JIS K 7210.

7. Gloss (%)

It was measured according to JIS K 7105.

8. Heat Seal Temperature (HST, °C.)

It was found according to a method comprising the steps of:
  (1) lapping two films one over the other,
  (2) pressing the films lapped to complete heat-seal under a load of 2 kg/cm$^2$ for 2 seconds at a specified temperature within a range of from 65 to 115° C. using a heat sealer manufactured by Toyoseiki Co.,
  (3) conditioning the heat-sealed films over night at 23° C. and 50% humidity,
  (4) subjecting the conditioned films to peeling under conditions of temperature of 23° C., humidity of 50%, peeling speed of 200 mm/min. and peeling angle of 180°, thereby finding strength of peeling resistance, and
  (5) taking, as heat seal temperature, a temperature at which the heat-seal is carried out and the strength of peeling resistance reaches 300 g/25 mm.

9. Blocking (kg/12 cm$^2$)

It was found according to a method comprising the steps of:
  (1) lapping two films one over the other,
  (2) treating the films lapped under a load of 500 g/12 cm$^2$ at 60° C. for 3 hours, thereby performing blocking, and
  (3) subjecting a species of the blocked films to shear peeling to find a maximum load (kg), which is taken as blocking.

10. Processability

A film subjected to biaxial orientation and thereafter passed through an oven was touched directly with hand to complete evaluation according to the criteria of ○ (no sense of stickiness), Δ (sense of somewhat stickiness) and X (very sticky).

Example 1

1. Production of Solid Catalyst

In a 200 liter SUS reaction vessel equipped with a stirrer, which has been purged with nitrogen, 80 liters of hexane, 6.55 mol of tetrabutoxytitanium, 2.8 mol of diisobutyl phthalate and 98.9 mol of tetrabutoxysilane were introduced to form a uniform solution.

To the solution, 51 liters of a diisobutyl ether solution of butylmagnesium chloride having a concentration of 2.1 mol/liter was gradually dropped over 5 hours, while keeping temperature in the reaction vessel at 5° C. After completion of dropping, the mixture was further stirred for 1 hour at ambient temperature. Thereafter, the reaction mixture was separated into a liquid and a solid at ambient temperature, and the solid was washed three times with each 70 liters of toluene.

Successively, the toluene was taken out therefrom so as to make a slurry concentration 0.6 kg/liter. Thereafter, a mixed liquid of 8.9 mol of n-butyl ether and 274 mol of titanium tetrachloride was added thereto, further 20.8 mol of phthalic chloride was added thereto, and the mixture was allowed to react at 110° C. for 3 hours. After completion of the reaction, the reaction mixture was separated into a liquid and a solid at 110° C., and the solid was washed two times with toluene at 95° C.

Successively, toluene was added to the washed solid to make a slurry concentration 0.6 kg/liter. Thereafter, 3.13 mol of diisobutyl phthalate, 8.9 mol of n-butyl ether and 137 mol of titanium tetrachloride were added to the slurry, and the mixture was allowed to react at 105° C. for 1 hour. After completion of the reaction, the reaction mixture was separated into a liquid and a solid at that temperature, and the solid was washed two times with each 90 liters of toluene at 95° C.

Successively, toluene was added to the washed solid to make a slurry concentration 0.6 kg/liter. Thereafter, 8.9 mol of n-butyl ether and 137 mol of titanium tetrachloride were added to the slurry, and the mixture was allowed to react at 95° C. for 1 hour. After completion of the reaction, the reaction mixture was separated into a liquid and a solid at that temperature, and the solid was washed three times with each 90 liters of toluene at that temperature.

Successively, toluene was added to the washed solid to make a slurry concentration 0.6 kg/liter. Thereafter, 8.9 mol of n-butyl ether and 137 mol of titanium tetrachloride were added to the slurry, and the mixture was allowed to react at 95° C. for 1 hour. After completion of the reaction, the reaction mixture was separated into a liquid and a solid at that temperature, and the solid was washed three times with each 90 liters of toluene at that temperature, thereafter further washed three times with each 90 liters of hexane and successively dried under reduced pressure, thereby obtaining 11.0 kg of a solid catalyst component.

The solid catalyst component was found to contain a titanium atom, a magnesium atom, a phthalic acid ester, an ethoxy group and a butoxy group of 1.89% by weight, 20% by weight, 8.6% by weight, 0.05% by weight and 0.21% by weight, respectively, and have a good particulate state having no fine powder.

2. Pre-Activation of Solid Catalyst

In a 3 liter SUS autoclave equipped with a stirrer, 1.5 liters of thoroughly dewatered and deaerated n-hexane, 37.5 mmol of triethylaluminum, 3.75 mmol of t-butyl-n-propyldimethoxysilane and 15 g of the above solid catalyst component were introduced to produce a solid catalyst.

While keeping temperature in the autoclave at 5 to 15° C., 15 g of propylene was continuously supplied thereto over 15 minutes, thereby obtaining a slurry of a pre-activated solid catalyst.

The slurry was transferred to a 200 liter SUS autoclave equipped with a stirrer. Thereafter, 140 liters of liquefied butane was added thereto to obtain a diluted product, which was stored at 5° C. or below.

3. Polymerization to Obtain Propylene Copolymer (X)

(1) Step 1

In a 300 liter SUS polymerization vessel equipped with a stirrer, liquefied propylene and 1-butene were fed at 35 kg/hour and 13 kg/hour, respectively, and hydrogen was introduced therein to keep a gas phase concentration at 0.5% by volume.

Successively, the pre-activated solid catalyst was supplied thereto at 0.6 g/hour, and bulk polymerization was continued at 60° C. using the liquefied propylene as a medium under a condition such that the slurry stayed in the vessel was substantially kept to 90 liters, thereby obtaining a copolymer slurry (a slurry containing the copolymer component (A)).

Yield of the copolymer was found to be 2.0 kg/hour, a part of the copolymer was analyzed, and as a result, a 1-butene unit content was found to be 7.7% by mol. The above copolymer slurry was continuously transferred to step 2 as described below without deactivation.

(2) Step 2

In a 1 m$^3$ gas phase fluidized bed reactor equipped with a stirrer, the polymer slurry transferred from the above step 1, triethylaluminum at 50 mmol/hour, t-butyl-n-propyldimethoxysilane at 5 mmol/hour, propylene, hydrogen and 1-butene were supplied to perform continuous polymerization at 65° C., thereby obtaining a copolymer component (B)-containing propylene copolymer (X-1) at a production rate of 22.2 kg/hour. A polymer retention in the fluidized bed, polymerization pressure, a hydrogen concentration in the gas phase and a 1-butene concentration in the gas phase were 80 kg, 1.15 MPa, 2.5% by volume and 25% by volume, respectively.

A 1-butene unit content in the copolymer (X-1) was found to be 20.0% by mol. A weight ratio of the copolymer component (A) obtained in step 1 to the copolymer component (B) obtained in step 2 was found to be 10/90 from respective yields of the copolymer components in the above steps. A 1-butene unit content in the copolymer component (B) was found to be 21.8% by mol. Further, a main endothermic peak of the copolymer (X-1) was found to be 29%.

4. Pelletization of Composition

The above propylene copolymer (X-1) in an amount of 97% by weight, a propylene polymer having a melting point of 165° C., a commercial name of SUMITOMO NOBLEN HU100G, manufactured by Sumitomo Chemical Co, Ltd., (corresponds to the propylene polymer (W), hereinafter referred to as "propylene polymer (W-1)"), in an amount of 3% by weight, provided that a total weight of the copolymer (X-1) and the propylene polymer (W-1) was taken as 100% by weight, 0.1 part by weight of calcium stearate, 0.05 part by weight of an additive, a commercial name of IRGANOX 1010, manufactured by Ciba Specialty Chemicals, Co., 0.1 part by weight of 2,6-di-t-butyl-4-methylphenol, a commercial name of BHT, manufactured by Sumitomo Chemical Co., Ltd., and 0.4 part by weight of an additive, a commercial name of TOSPEARL 120, manufactured by GE Toshiba Silicones Co. (provided that a total weight of components used was taken as 100 parts by weight) were mixed, and thereafter the mixture was melt kneaded to obtain a pellet. An MFR of the pellet obtained was found to be 8.0 g/10 min.

5. Preparation of Oriented Film

Using No.1 extruder, the above pellet (for outer layer use as described below) was melt kneaded at 230° C., using No. 2 extruder, polypropylene (melting point=159° C., MFR=2.5 g/10 min.), a commercial name of FS2011DG2, manufactured by Sumitomo Chemical Co., Ltd., (for substrate layer use as described below) was melt kneaded at 260° C., and both melt kneaded products were supplied to a co-extrusion T die.

From said T die, a 2-kind-2-layer laminate comprising the outer layer and the substrate layer was extruded, and rapidly cooled and solidified with a cooling roll of 30° C., thereby obtaining a cast sheet having a thickness of 1 mm.

The cast sheet was pre-heated, stretched 5 times in a machine direction at 125° C. using difference in a peripheral speed of a machine direction-stretching machine, and stretched 8 times in a transverse direction at 157° C. using a heating furnace. Successively, the resulting sheet was heat-treated at 165° C. and wound into a reeling machine, thereby obtaining a two layered biaxial oriented film having an outer layer thickness of 1.5 μm and a substrate layer thickness of 20 μm. Physical properties of the laminated film obtained are shown in Table 1.

Example 2

Example 1 was repeated except that a blended ratio of the propylene copolymer (X-1) and the propylene polymer (W-1) was changed to 90/10 (parts by weight), thereby obtaining a pellet (MFR=9.5 g/10 min). Successively, a biaxial oriented laminated film was obtained by a method similar to that in Example 1. Physical properties of the laminated film are shown in Table 1.

Example 3

Example 1 was repeated except that a blended ratio of the propylene copolymer (X-1) and the propylene polymer (W-1) was changed to 85/15 (parts by weight), and thereby obtaining a pellet (MFR=8.9 g/10 min). Successively, a biaxial oriented laminated film was obtained by a method similar to that in Example 1. Physical properties of the laminated film are shown in Table 1.

Example 4

Example 1 was repeated except that (1) a blended ratio of the propylene copolymer (X-1) was changed to 70% by weight, (2) a blended ratio of the propylene polymer (W-1) was changed to 5% by weight, and (3) 25% by weight of a propylene/ethylene random copolymer (ethylene content=4.6% by weight) (corresponding to the copolymer (Y), hereinafter referred to as "copolymer (Y-1)"), a commercial name of SUMITOMO NOBLEN RW150XG, manufactured by Sumitomo Chemical Co., Ltd., was used in combination with the propylene polymer (W-1), thereby obtaining a pellet (MFR=8.2 g/10 min). Successively, a biaxial oriented laminated film was obtained by a method similar to that in Example 1. Physical properties of the laminated film are shown in Table 1.

Example 5

Example 1 was repeated except that (1) a blended ratio of the propylene copolymer (X-1) was changed to 65% by weight, and (2) a 35% by weight of the above-mentioned copolymer (Y-1) and 0.1 part by weight of a high density polyethylene (MFR=16.5, density=0.956) (corresponding to the nucleating agent (N), hereinafter referred to as "nucleating agent (N-1)") (total weight of the propylene copolymer (X-1) and the copolymer (Y-1) was taken as 100 parts by weight, corresponding to "phr" in Table 1) were used in place of the propylene polymer (W-1), thereby obtaining a pellet (MFR=9.2 g/10 min). Successively, a biaxial oriented laminated film was obtained by a method similar to that in Example 1. Physical properties of the laminated film are shown in Table 1.

Comparative Example 1

Using a titanium trichloride-type solid catalyst system similar to that disclosed in Japanese Patent Publication No. 2-57770, a propylene/1-butene copolymer (hereinafter referred to as "propylene copolymer (X-2)") was obtained by a one-step gaseous polymerization process. A content of a 1-butene unit in the propylene copolymer (X-2) was 19.2% by mol, and a main endothermic peak of the propylene copolymer (X-2) was found to be 37%.

Only the propylene copolymer (X-2) was pelletized by a method similarly to that in Example 1, thereby obtaining a pellet (MFR=8.3 g/10 min). Successively, a 2-kind-2-layer laminate was obtained by a method similar to that in Example 1. Physical properties of the laminate are shown in Table 1. As shown in Table 1, "Heat seal temperature" of the laminate was higher, and "Blocking" and "Processability" thereof were poor.

Comparative Example 2

Example 1 was repeated except that (1) the propylene copolymer (X-1) was changed to 90% by weight of the above-mentioned propylene copolymer (X-2), and (2) a blended ratio of the propylene polymer(W-1) was changed to 10% by weight, thereby obtaining a pellet (MFR=10.1 g/10 min). Successively, a biaxial oriented laminated film was obtained by a method similar to that in Example 1. Physical properties of the laminated film are shown in Table 1. As shown in Table 1, "Heat seal temperature" of the laminated film was higher.

Comparative Example 3

Only the propylene copolymer (X-1) was pelletized by a method similarly to that in Example 1, thereby obtaining a pellet (MFR=8.2 g/10 min). Successively, a 2-kind-2-layer laminate was obtained by a method similar to that in Example 1. Physical properties of the laminate are shown in Table 1. As shown in Table 1, "Blocking" and "Processability" of the laminate were poor.

(b) 86 to 97% by weight of a propylene unit, provided that a total of the selected unit(s) and the propylene unit is taken as 100% by weight, (3) the propylene polymer (W) has a melting point of not lower than 155° C., and comprises:
  (a) 0 to less than 3% by weight of at least one unit selected from the group consisting of an ethylene unit and an α-olefin unit having not less than 4 carbon atoms, and
  (b) 97 to 100% by weight of a propylene unit, (4) the propylene copolymer (X) has 15 to 36% of an endothermic heat quantity within a temperature range of from a temperature lower by 10° C. than a temperature corresponding to a maximum endothermic peak to a temperature higher by 10° C. than a temperature corresponding to a maximum endothermic peak, in measurement of a melting point by means of a differential scanning calorimeter, provided that an endothermic heat quantity within a temperature range of from 53 to 170° C. is taken as 100%,

TABLE 1

| | Example | | | | | Comparative Example | | |
|---|---|---|---|---|---|---|---|---|
| | 1 | 2 | 3 | 4 | 5 | 1 | 2 | 3 |
| Component contained in resin composition used as outer layer of laminated film | | | | | | | | |
| Propylene copolymer(X) (% by weight) | X-1(97) | X-1(90) | X-1(85) | X-1(70) | X-1(65) | X-2(100) | X-2(90) | X-1(100) |
| Copolymer(Y) (% by weight) | — | — | — | Y-1(25) | Y-1(35) | — | — | — |
| Propylene polymer(W) (% by weight) | W-1(3) | W-1(10) | W-1(15) | W-1(5) | — | — | W1(10) | — |
| Nucleating agent(N) (phr) | — | — | — | — | N-1(0.1) | — | — | — |
| Melt flow rate(g/10 min.) | 8.0 | 9.5 | 8.9 | 8.2 | 9.2 | 8.3 | 10.1 | 8.2 |
| Haze(%) | 2.6 | 2.5 | 2.5 | 2.5 | 2.6 | 2.5 | 2.6 | 2.4 |
| Heat seal temperature(° C.) | 96 | 91 | 90 | 95 | 96 | 99 | 97 | 96 |
| Blocking(kg/12 cm$^2$) | 0.38 | 0.31 | 0.31 | 0.34 | 0.38 | 0.72 | 0.45 | 0.58 |
| Processability | ○ | ○ | ○ | ○ | Δ | X | ○ | X |

The invention claimed is:

1. A polypropylene resin composition comprising:
  (i) 10 to 99% by weight of a propylene copolymer (X),
  (ii) 0 to 60% by weight of a copolymer (Y), and
  (iii) at least one member selected from the group consisting of 1 to 30% by weight of a propylene polymer (W) and 0.1 to 3 parts by weight of a nucleating agent (N), wherein,
  (1) the propylene copolymer (X) comprises:
    (a) 1 to 30% by weight of a copolymer component (A) comprising propylene and at least one member selected from the group consisting of an α-olefin having not less than 4 carbon atoms and ethylene, and satisfying the following requirements (1) and (2), and
    (b) 70 to 99% by weight of a copolymer component (B) comprising propylene and at least one member selected from the group consisting of an α-olefin having not less than 4 carbon atoms and ethylene and propylene, and satisfying the following requirements (3) and (4), provided that a total of the copolymer components (A) and (B) is taken as 100% by weight,
  (2) the copolymer (Y) comprises:
    (a) 3 to 14% by weight of at least one unit selected from the group consisting of an α-olefin unit and an ethylene unit, and (5) with respect to the % by weight of the propylene copolymer (X), the copolymer (Y) and the propylene polymer (W), a total weight thereof is taken as 100% by weight, and with respect to the part by weight, a total weight thereof is taken as 100 parts by weight, and
  (6) the requirements are:
    requirement (1): a content of the α-olefin unit having not less than 4 carbon atoms in the copolymer component (A) is from 1 to less than 15% by mol,
    requirement (2): an ethylene unit content in the copolymer component (A) is not more than 5% by mol,
    requirement (3): a content of the α-olefin unit having not less than 4 carbon atoms in the copolymer component (B) is from 15 to 30% by mol, and
    requirement (4): an ethylene unit content in the copolymer component (B) is not more than 5 mol %.

2. The polypropylene resin composition according to claim 1, wherein the copolymer component (A) contained in the propylene copolymer (X) comprises a copolymer component obtained in the first step of a process for producing the propylene copolymer (X), and the copolymer component (B) contained in the propylene copolymer (X) comprises a copolymer component obtained in the second or succeeding step thereof.

3. The polypropylene resin composition according to claim 2, wherein the first step is a polymerization step carried out in the absence of an inert solvent, and the second or succeeding step is a polymerization step carried out in a gas phase.

4. The polypropylene resin composition according to claim 1, wherein the propylene copolymer (X) is a copolymer obtained by polymerization in the presence of a catalyst comprising a solid catalyst component containing as essential components Ti, Mg and a halogen.

5. The polypropylene resin composition according to claim 1, wherein the composition comprises:
  (i) 20 to 99% by weight of a propylene copolymer (X),
  (ii) 0 to 60% by weight of a copolymer (Y), and
  (iii) at least one member selected from the group consisting of 1 to 20% by weight of a propylene polymer (W) and 0.1 to 3 parts by weight of a nucleating agent (N), provided that with respect to the % by weight of the propylene copolymer (X), the copolymer (Y) and the propylene polymer (W), a total weight thereof is taken as 100% by weight, and with respect to the part by weight, a total weight thereof is taken as 100 parts by weight.

6. A film comprising the polypropylene resin composition according to claim 1, or a laminated film having a layer comprising said polypropylene resin composition.

* * * * *